(12) United States Patent
You

(10) Patent No.: US 6,832,977 B2
(45) Date of Patent: Dec. 21, 2004

(54) HYDRAULIC CONTROL SYSTEM FOR AN AUTOMATIC TRANSMISSION

(75) Inventor: Beong-Yeol You, Daejeon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/335,000

(22) Filed: Dec. 31, 2002

(65) Prior Publication Data
US 2004/0005956 A1 Jan. 8, 2004

(30) Foreign Application Priority Data
Jul. 8, 2002 (KR) ................................ 10-2002-0039429

(51) Int. Cl.[7] ............................................. F16H 61/02
(52) U.S. Cl. ...................................... 477/161; 477/163
(58) Field of Search ................................ 477/158, 159, 477/160, 161, 162, 163

(56) References Cited

U.S. PATENT DOCUMENTS

| | | | |
|---|---|---|---|
| 3,604,288 A | * | 9/1971 | Mori ............................ 477/161 |
| 4,283,970 A | * | 8/1981 | Vukovich .................... 477/161 |
| 4,939,957 A | * | 7/1990 | Asano et al. ................ 477/161 |
| 4,972,738 A | * | 11/1990 | Narita .......................... 477/162 |
| 5,113,719 A | * | 5/1992 | Suzuki et al. ................ 477/163 |
| 5,303,615 A | * | 4/1994 | Iizuka .......................... 477/163 |
| 6,022,293 A | | 2/2000 | Dourra et al. |
| 6,110,072 A | * | 8/2000 | Harada et al. ............... 477/157 |

FOREIGN PATENT DOCUMENTS

| | | | |
|---|---|---|---|
| DE | 4015934 | 3/1991 | |
| JP | 01065355 A | * 3/1989 | ............. F16H/5/66 |

* cited by examiner

Primary Examiner—Richard M. Lorence
(74) Attorney, Agent, or Firm—Morgan Lewis & Bockius LLP

(57) ABSTRACT

The hydraulic control system includes a driving condition detection unit, a transmission control unit, and a driving unit. The driving condition detection unit detects driving conditions of a vehicle. The transmission control unit performs variable line pressure control using a minimum line pressure and a line-pressure-decreasing gradient calculated based on driving condition data detected by the driving condition detection unit when the driving conditions satisfy variable line pressure control entrance conditions. The driving unit adjusts a duty ratio of line pressure applied to friction elements according to a line pressure control signal generated by the transmission control unit.

32 Claims, 5 Drawing Sheets

HYDRAULIC CONTROL SYSTEM FOR AN AUTOMATIC TRANSMISSION

FIELD OF THE INVENTION

The present invention relates to a vehicle's automatic transmission. In particular, the present invention relates to a hydraulic control system and method for automatic transmissions capable of improving gasoline mileage and shift quality by adjusting hydraulic pressure applied to friction elements of the automatic transmission.

BACKGROUND OF THE INVENTION

Typically, a transmission controller of an automatic transmission shifts between gears by controlling a plurality of solenoid valves installed on hydraulic lines, based on driving conditions of the vehicle, such as an operational speed of the vehicle, a degree of throttle opening, or the like. That is, if a shift lever is manipulated to a target position, a manual valve operates to change or convert its ports such that hydraulic pressure from an oil pump is supplied to appropriate operating elements of the gear shift mechanism, according to a duty control of the solenoid valves under control of the transmission controller.

When the transmission operated by the shift lever is positioned at a desired range, the hydraulic pressure is applied to some friction elements and released from other friction elements so as to establish a predetermined gear ratio. Accordingly, the transmission performance depends on the timing of applying and releasing hydraulic pressure to and from the predetermined friction elements for the target gear ratio.

In the case of an electrical transmission control system in which gear shifting is performed by applying hydraulic pressure to the friction elements, the pressure level applied to the friction elements is a stable standard line pressure. The hydraulic pressure is supplied from an oil pump that is mechanically connected to the engine so as to operate according to the engine operation, and the oil pump should be designed to sufficiently supply the hydraulic pressure in various ranges of engine rpm, starting about 700 to 800 rpm, and to maintain the hydraulic pressure so as to be failsafe even under the worst conditions.

The line pressure is set to satisfy various driving conditions such that if the line pressure is adjusted according to driving conditions it is possible to reduce the power wastage caused by the oil pump, resulting in improved gasoline mileage.

However, in the case of an automatic transmission performing a gear shift using a clutch to clutch method, the standard line pressure may change while adjusting the line pressure such that the friction elements from which the hydraulic pressure is released and the friction elements to which the hydraulic pressure is applied are simultaneously controlled. This is unlike the clutch to one-way clutch method, resulting in difficulty of line pressure control and degradation of shift control stability.

Furthermore, in conventional transmission control, it is impossible to estimate the time taken for the line pressure to reach the predetermined pressure level in the case of shift delay control, during which the line pressure increases to a predetermined pressure level before shifting. Also, it is required to determine friction coefficients of the friction elements of the transmission, deviation of the hydraulic pressure, and durability for the control of the line pressure in an in-gear state in which a certain shift range is synchronized without shifting gears.

SUMMARY OF THE INVENTION

In a preferred embodiment of the present invention, the hydraulic control system for an automotive automatic transmission comprises a driving condition detection unit, a transmission control unit, and a driving unit. The driving condition detection unit detects driving conditions of a vehicle. The transmission control unit performs variable line pressure control using a minimum line pressure and a line-pressure-decreasing gradient calculated based on driving condition data detected by the driving condition detection unit when the driving conditions satisfy variable line pressure control entrance conditions. The driving unit adjusts a duty ratio of line pressure applied to friction elements according to a line pressure control signal generated by the transmission control unit.

It is preferable that the driving condition detection unit comprises: an engine rpm sensor for detecting engine rpm of the vehicle; a throttle-opening sensor for detecting throttle opening degree; a turbine rpm sensor for detecting turbine rpm of a torque converter of the vehicle; a driving shaft rpm sensor for detecting rpm of a driving shaft of the vehicle; a hydraulic fluid temperature sensor for detecting hydraulic fluid temperature of the transmission; an atmospheric pressure sensor for detecting atmospheric pressure of an area where the vehicle is running; and an inhibit-on switch for detecting a position of a shift lever.

Preferably, the transmission control unit calculates a compensation value for variable line pressure control, based on the throttle opening degree.

It is preferable that the transmission control unit controls such that the variable line pressure control duty increases according to the change of the throttle opening degree and then is eliminated when engine power is normalized. It is further preferable that the transmission control unit calculates a line pressure control compensation value and hydraulic characteristics according to the hydraulic fluid temperature and engine rpm, and applies the calculation to the variable line pressure control duty. Preferably, the transmission control unit calculates a compensation value for a clutch friction coefficient according to a deviation and durability of the transmission and reflects the compensation value to a variable line pressure control duty.

It is preferable that the transmission control unit learns a minimum required line pressure by detecting an in-gear slip.

Preferably, the transmission control unit sets a delay time for increasing a shift begin line pressure to 100% for control stability.

It is preferable that the transmission control unit sets a minimum delay time by estimating a line pressure at a shift begin point without a hydraulic pressure sensor and a time taken for the line pressure reach to 100%.

It is preferable that the transmission control unit sets a minimum shift delay time in a slow kick-down.

Preferably, the transmission control unit sets a minimum shift delay time during lift-foot-up.

In another preferred embodiment of the present invention, the hydraulic control method comprises: determining whether or not driving conditions detected in a non-variable line pressure control mode satisfy variable line pressure control entrance conditions; determining whether or not gears are in an in-gear state by calculating a gear ratio using an engine rpm and turbine rpm when the driving conditions satisfy the variable line pressure control entrance conditions; entering a variable line pressure control mode in an in-gear state, and performing the variable line pressure control by calculating a minimum line pressure and variable line pressure gradient; determining whether or not a present line pressure is less than the calculated minimum line pressure; performing a normal line pressure control when the present line pressure is less than the minimum line pressure and then determining whether a gear shift starts or a damper clutch is in a direct coupled state; performing a gear shift to a target gear ratio after a predetermined time from a point when a line pressure control duty reaches 100% if it is determined that the gear shift starts or the damper clutch is in the direct coupled state in normal line pressure control; and performing variable line pressure control according to the driving conditions by entering the variable line pressure control mode for determining another shift begin point after delaying for a predetermined time if the gear shift to the target gear ratio is completed.

Preferably, the variable line pressure control mode entrance conditions include: the present hydraulic fluid temperature is between a preset lowest limit minimum value and lowest limit maximum value; a CAN (Controller Area Network) communication line providing an interface for various control data and detection signals is not broken down; an inhibit-on switch, hydraulic sensor, and line pressure solenoid valve are normal; a present detected atmospheric pressure value is less than a threshold atmospheric pressure value for determining whether or not the vehicle is running at a high altitude; a shift lever is positioned at one the D, 4, 3, and 2 ranges, or 2, 3, 4, and 5 ranges in sports mode; a throttle opening degree (TPS) is less than a preset threshold opening degree with a compensation value added thereto; an engine rpm is less than a threshold engine rpm; and engine rpm detection and turbine rpm detection are performed normally.

It is preferable that driving condition data do not satisfy the variable line pressure control mode entrance conditions, a line pressure control mode returns to a non-variable line pressure control mode.

Preferably, a line pressure control mode returns to a non-variable line pressure control mode if an in-gear state is not detected.

It is preferable that the in-gear state is a state where certain gears are engaged for a predetermined gear ratio according to driving conditions.

It is also preferable that the variable line pressure control is performed in such a way that if it is the first in-gear state after reset of the battery, the transmission control unit decreases the line pressure from 100% by the gradient per cycle and stores count values in respective learning areas.

Preferably, in a case of performing variable line press control according to respective learning areas, the variable line pressure control is not performed at 100% of line pressure but at the point (A+[(Dvfs)min]) where the line pressure is increased by as much as a predetermined percentage at the minimum required line pressure duty.

It is preferable that the minimum line pressure calculation includes: detecting an engine brake torque (TB); detecting a turbine torque (TT); detecting a required line pressure (PL); detecting a standard value (D_BASE) of the required line pressure from a standard duty of the line pressure; and calculating the minimum line pressure by adding various compensating coefficients to the standard value (D_BASE) of the required line pressure.

It is preferable that if an in-gear slip is detected while the variable line pressure control controls to the minimum line pressure, a new minimum line pressure is learned according to the driving conditions and vehicle's durability, and then the minimum line pressure is reflected to the variable line pressure control.

It is preferable if another gear shift begins or a damper clutch is in a direct coupled state, the line pressure duty increases to 100%, and then the gear shift to the target gear ratio is performed after a predetermined time delay.

It is preferable that if a throttle opening degree is changed in the variable line pressure control, the line pressure is compensated according to the change of the throttle opening degree.

Preferably, if an in-gear slip is detected in a normal line pressure control procedure, a minimum line pressure is learned according to the driving conditions and vehicle's durability and applied for the line pressure control.

It is preferable that the delay time is set, in a map table, based on the line pressure at a shift begin point in a power-on up-shift condition, based on the line pressure at a point prior to a predetermined period from the shift begin point in a power-off up-shift condition, based on a value obtained by subtracting a slow kick-down compensation value (Tsk) from a map value (Tdo) set at a point prior to a predetermined period from the shift begin point at a power-on down-shift condition, and based on the line pressure at the shift begin point in the power-off down-shift condition.

It is preferable that the engine brake torque (TB) is calculated using a maximum engine torque (TQ_STND), a compensation vale (TOI_hex) obtained based on the driving conditions such as an intake air amount, temperature of the intake air, fuel injection amount, ignition point, and the like, and a torque loss caused by engine friction, according to the following equation:

$$TB=TQ\_STND*(TQI\_hex-TQFR\_hex)/255/9.8$$

It is preferable that the turbine torque (TT) is calculated using a torque ratio (tr) of a torque converter obtained according to a ratio (Nt/Ne) of an engine rpm (Ne) and turbine rpm (Nt) in a map (TTRQRTP) of a ratio of the engine torque and torque converter torque, according to the following equation:

$$TT=TB*tr$$

It is preferable that in the 4 range automatic transmission, the required line pressure (PL) in the state where the damper clutch (D/C) is directly coupled is calculated as in the following equation:

$$PL=\text{turbine torque coefficient } (XVF\_PTDC) \times \text{safe factor } (XVF\_SF) \times \text{turbine torque } (TT);$$

it is calculated as in the following equation 14 when the damper clutch (D/C) is not in the direct coupled state:

$$\text{1st gear--}PL=XVF\_PTA \times XVF\_SF \times TT+XVF\_OFB$$

$$\text{2nd gear--}PL=XVF\_PTA \times XVF\_SF \times TT+XVF\_OFB$$

$$\text{3rd gear--}PL=XVF\_PTA \times XVF\_SF \times TT+XVF\_OFB$$

$$\text{4th gear--}PL=XVF\_PTA \times XVF\_SF \times TT+XVF\_OFB;$$

and in a 5 range automatic transmission, the required line pressure (PL) in the direct coupled state of the damper clutch (D/C) is calculated as in the following equation:

2nd gear–$PL = XVF\_PTDCA \times XVF\_SF \times TT + XVF\_OFB$

4th gear–$PL = XVF\_PTDCA \times XVF\_SF \times TT + XVF\_OFB$

5th gear–$PL = XVF\_PTDCA \times XVF\_SF \times TT + XVF\_OFB$;

when the damper clutch (D/C) is in the direct coupled state at any of the 1 and 3 range, the required line pressure (PL) is calculated as in the following equation:

$PL = XVF\_PTDC \times XVF\_SF \times TT$;

and at the normal ranges where the damper clutch (D/C) is not in the direct coupled state, the required line pressure (PL) is calculated as in the following equation:

1st gear–$PL = XVF\_PTA \times XVF\_SF \times TT + XVF\_OFB$

2nd gear–$PL = XVF\_PTA \times XVF\_SF \times TT + XVF\_OFB$

3rd gear–$PL = XVF\_PTA \times XVF\_SF \times TT + XVF\_OFB$

4th gear–$PL = XVF\_PTA \times XVF\_SF \times TT + XVF\_OFB$

5th gear–$PL = XVF\_PTA \times XVF\_SF \times TT + XVF\_OFB$;

wherein when the required line pressure (PL) is less than the preset minimum line pressure [3.2(XVF_PLMIN)], the required line pressure (PL) is set equal to the minimum line pressure [3.2(XVF_PLMIN)], XVF_PTA is a turbine torque coefficient for calculating the required line pressure (PL) at the corresponding range, XVF_SF is a safety factor which is about 1.2, TT is a turbine torque, and XVF_OFB is an offset value for calculating the required line pressure (PL) at the corresponding range.

It is preferable that minimum line pressure [(Dvfs)min]] is calculated as in the following equation:

$(Dvfs)\min = (D\_BASE + D\_L) \times C\_TEMP \times C\_NE + D\_TH$, where D_L is a learned value of the line pressure duty, C_TEMP is a hydraulic fluid temperature compensation value, C_NE is an engine rpm compensation value, and D_TH is a throttle-opening compensation value.

It is preferable that the in-gear slip is determined: when the value obtained by subtracting the turbine rpm (Nt) from the engine rpm (Ne) is greater than a predetermined first threshold rpm, or an absolute value obtained by subtracting the present turbine rpm (Nti) from the previous turbine rpm (Nt) is greater than a predetermined second threshold rpm, while the damper clutch is in direct coupled state; or when the absolute value obtained by subtracting the present turbine rpm (Nti) from the previous turbine rpm (Nt) is greater than a third threshold rpm, while the damper clutch is not completely coupled.

It is preferable that the slow kick-down compensation value is calculated as in the following equation:

$Tsk = \text{sum}\Delta D\_VFS \times Csk$ where sum$\Delta D$_VFS is a rate of change of the line pressure control duty value (D_VFS) between a point prior to a predetermined period from the SD and the SD, sum$\Delta D$_VFS can be expressed as in the following:

$\text{sum}\Delta D\_VFS = \Delta D\_VFS(i-x) + \Delta(D\_VFS(i-x+1)) + \ldots + \Delta(D\_VFS(i-2)) + \Delta(D\_VFS(i-1))$ where x is the slow kick-down compensation value, Csk is a compensation measurement which is expressed in unit of ms/%, and $\Box D\_VFS(j) = D\_VFS(i-x) - D\_VFS(j)$, D_VFD(i-x) is the line pressure control duty value (D_VFS) at the point prior to a certain period from the SD and expressed in the unit of %.

Preferably, the throttle-opening compensation value (D_TH) is calculated as in the following equation:

$D\_TH = \text{sum}[Dth(i-x) + Dth(i-x+1) + Dth(i-x+2) + \ldots + Dth(i-2) + Dth(i-1)]$ where $Dth(i) = (dVth/dt(i)) * Cth$ is expressed in unit of %, $dVth/dt(i)$ is a change rate of TPS [V/s](calculated per cycle); however, in case of $dVth/dt(i) \leq 0$, $dVth/dt(i)$ is set to 0, Cth is compensation factor [%N/s], x is a compensation time (XVF_THLDTH[ms]/16 ms) according to the change of the throttle opening degree.

The preferred embodiment of the present invention will be described hereinafter with reference to the accompanying drawings.

DETAILED DESCRIPTION OF THE INVENTION

Figure 1:
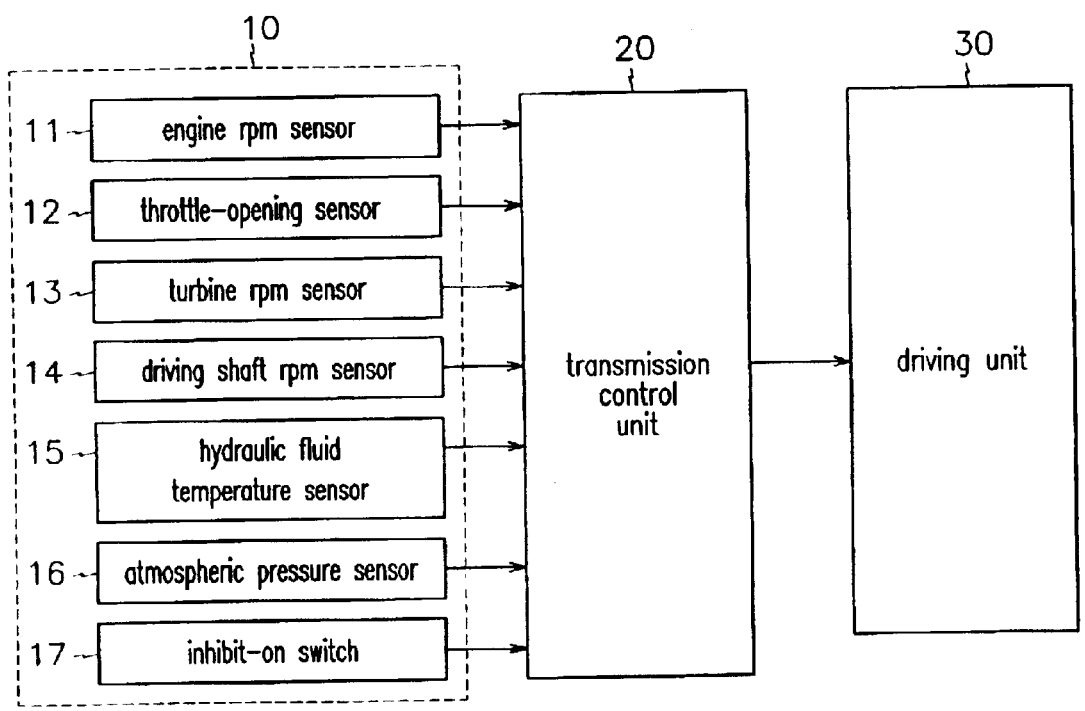
FIG. 1 is a block diagram illustrating a hydraulic control system of an automotive automatic transmission according to a preferred embodiment of the present invention.

As shown in FIG. 1, the hydraulic control system of the present invention comprises a driving condition detection unit 10, a transmission control unit 20, and a driving unit 30. The driving condition detection unit 10 comprises an engine rpm sensor 11, a throttle-opening sensor 12 for detecting change of the throttle opening degree (i.e., how far open the throttle is), a turbine rpm sensor 13 for detecting the turbine rpm of a torque converter, a driving shaft rpm sensor 14 for detecting rpm of the driving shaft, a hydraulic fluid temperature sensor 15 for sensing the hydraulic fluid temperature, an atmospheric pressure sensor 16 for sensing the atmospheric pressure, and an inhibit-on switch 17 for detecting the position of the shift lever.

The transmission control unit 20 computes a minimum line pressure based on the engine torque in accordance with a control signal from the driving condition detection unit 10; computes a throttle-opening compensation value for preventing a sudden increment of the engine rpm; computes a duty ratio and hydraulic characteristics compensation values for compensating changes of the duty ratio and hydraulic characteristics according to the hydraulic fluid temperature and engine rpm; computes friction coefficients of the friction elements; learns a minimum required line pressure by detecting in-gear-slip during the change of the hydraulic pressure; sets the shift delay time for increasing the line pressure to 100% before beginning the shift for shift control reliability; sets the minimum shift delay time by estimating the line pressure at the shift begin point and the time during which the line pressure takes to reach 100%; and minimizes the shift delay time during a slow kick-down and lift-foot-up (LFU) of the acceleration pedal, so as to control the line pressures for providing smooth shift feel and minimizing the waste of power in various modes.

The driving unit 30 adjusts the line pressure applied to the friction elements according to the control signal from the transmission control unit 20.

In the automatic transmission according to the present invention, conditions for the variable line pressure control mode of the transmission control unit 20 is set as follows. The variable line pressure control mode entrance conditions require: the present hydraulic fluid temperature (ATF) is between a preset lowest limit minimum value (XVF_OTPI_L) and a lowest limit maximum value (XVF_OTPI_H), i.e., (XVF_OTPI_L≦ATF≦XVF_OTPI_H); a CAN communication line providing an interface for various control data and detection signals is not broken down; the inhibit-on switch, a hydraulic sensor, and a line pressure solenoid valve (VFS) are normal; the present detected atmospheric pressure value (ZMMAP) is less than a threshold atmospheric pressure (XAPLMT1) for determining whether or not the vehicle is running at a high altitude; the shift lever is positioned at one of the D, 4, 3, and 2 ranges, or at 2, 3, 4, and 5 ranges in sports mode; the throttle opening degree (TPS) is less than a preset threshold opening degree after adding a compensation value (XVF_THPC+XVF_THPC_HYS); the engine rpm is less than a threshold engine rpm (XVF_NOPCI); the engine rpm detection and turbine rpm detection are normally performed; and all the above conditions are satisfied.

In addition, the variable line pressure control relief conditions are such that: the present hydraulic fluid temperature (ATF) is over a preset highest limit minimum value (XVF_OTPO_L) or greater than a preset highest limit maximum value (XVF_OTPO_H), i.e. ATF≧XVF_OTPO_L or XVF_OTPO_H≦ATF; the CAN communication line providing an interface for various control data and detection signals is malfunctioning; any of the inhibit-on switch, the hydraulic sensor, and the line pressure solenoid valve (VFS) is malfunctioning; the present detected atmospheric pressure value (ZMMAP) is greater than the threshold atmospheric pressure value (XAPLMT1) so the vehicle is determined to be running at a high altitude; the shift lever is positioned at one the P, N, R, and L ranges, or at 1 range in sports mode; the throttle opening degree (TPS) is greater than a preset threshold opening degree (XVF_THPC) or the engine rpm is greater than a preset threshold engine rpm (XVF_NOPCO); engine rpm detection and turbine rpm detection are abnormally performed; in-gear slip occurs; and any of the above conditions are satisfied.

Figure 2A:
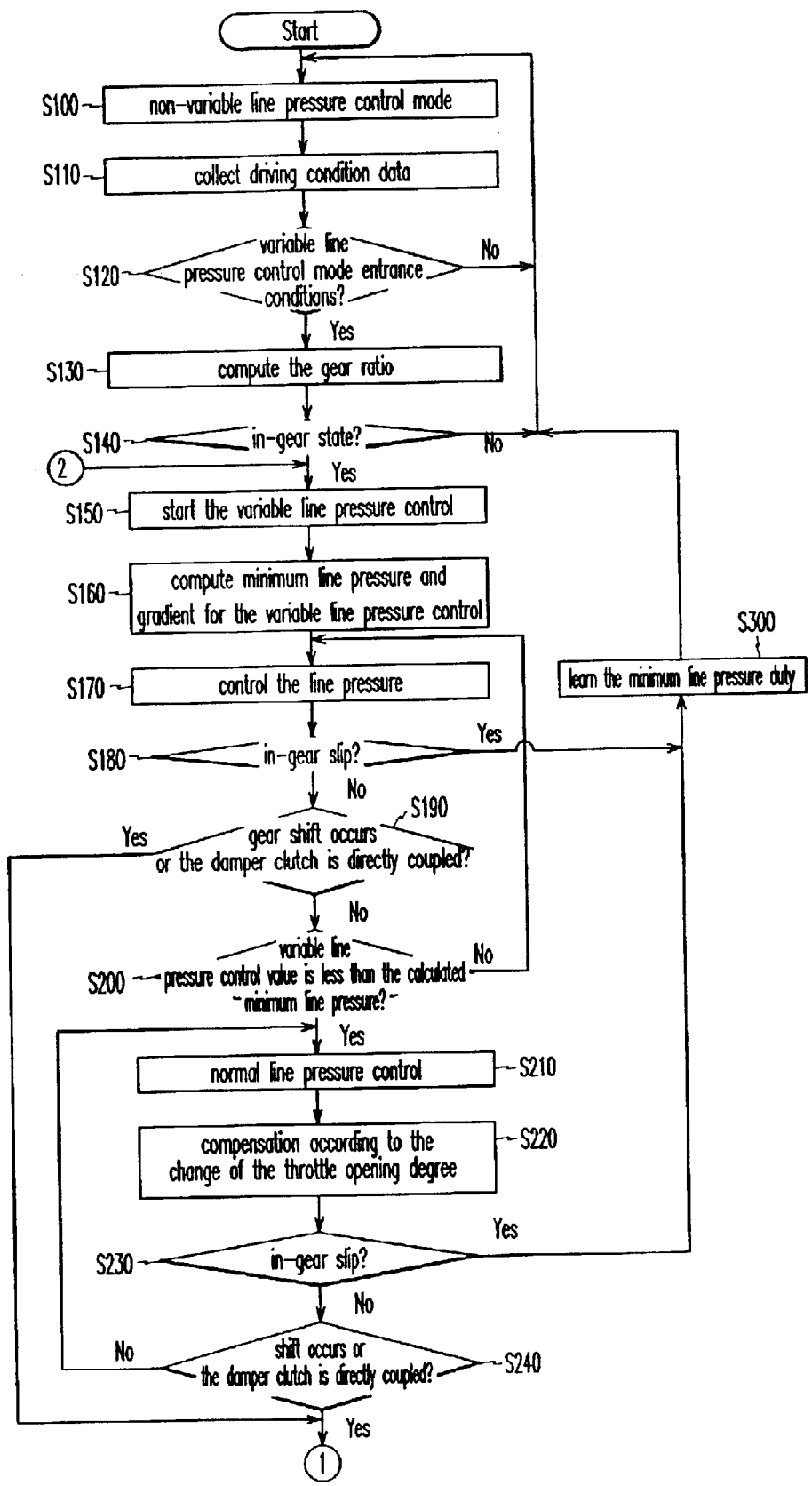
FIGS. 2A and 2B are flowcharts illustrating a hydraulic control method for the automotive automatic transmission according to a preferred embodiment of the present invention.
Figure 2B:
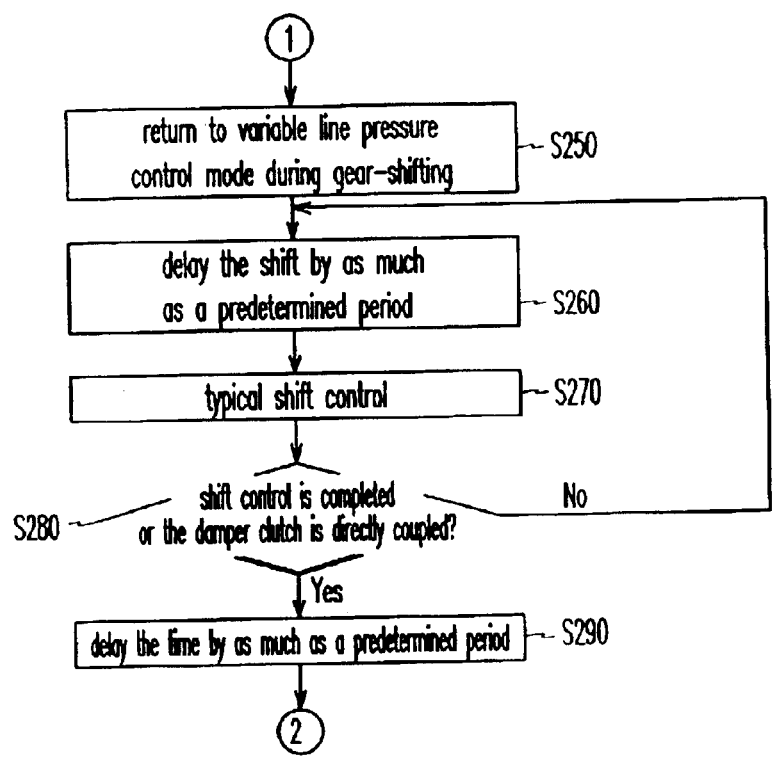

Looking at FIGS. 2A and 2B, in the case that the above-described variable line pressure control entrance and relief conditions are configured, at step S100, the transmission control unit (20) collects the driving condition data such as the engine rpm (RPM), throttle opening displacement (TH), turbine rpm (Nt), driving shaft rpm (No), hydraulic fluid temperature (ATF), atmospheric pressure, shift lever position, and so on, from the driving conditions detection unit 10 in the non-variable line pressure control mode in which the line pressure is maintained as 100%, at step S110. The transmission control unit (70) then determines whether or not the driving condition data satisfy the variable line pressure control mode entrance conditions at step S120.

If the driving condition data do not satisfy the variable line pressure control mode entrance conditions, the transmission control unit (20) continuously maintains a present line pressure of 100%. On the other hand, if the driving condition data satisfies the variable line pressure control entrance conditions, the transmission control unit (20) computes the gear ratio based on the turbine rpm (Nt) and driving shaft rpm (No) detected at the driving condition detection unit (10), at step S130. The transmission control unit (70) then determines whether or not any of the gears associated with the target gear ratio are in an in-gear state at step S140.

At step S140, if the associated gear is not in an in-gear state, the transmission control unit (20) withholds entrance to the variable line pressure control mode until the gear is in an in-gear state. On the other hand, if the associated gear is in an in-gear state, the transmission control unit (20) starts the variable line pressure control at step S150.

Figure 3:
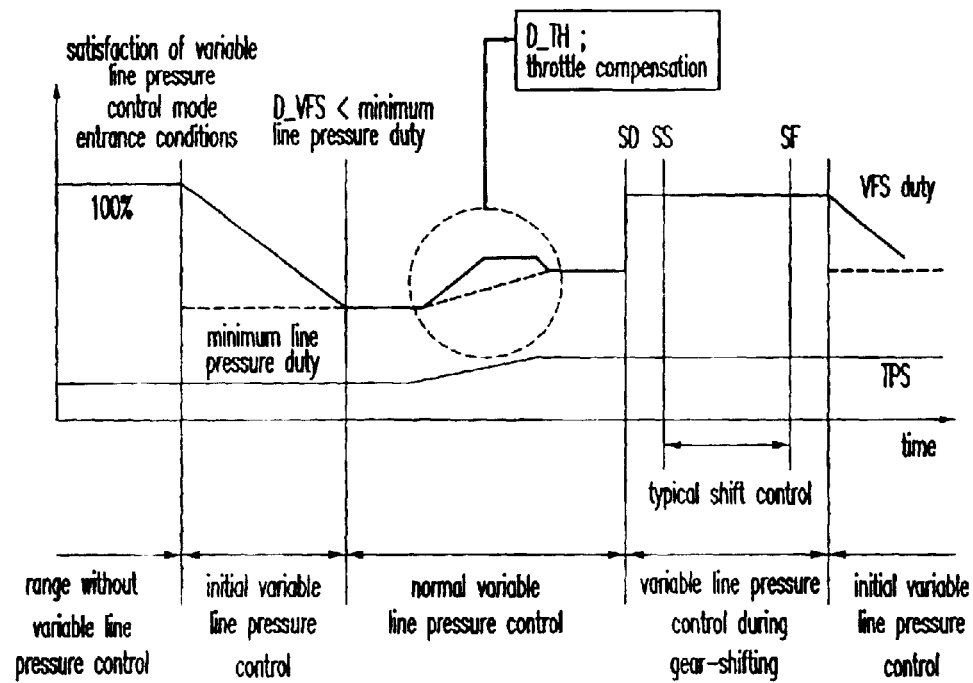
FIG. 3 is a graph illustrating line pressure control timing of the automotive automatic transmission of the present invention.

Once entering the variable line pressure control mode, the transmission control unit (20) computes the minimum line pressure duty [(Dvfs)min] that varies according to the driving conditions detected by the driving condition detection unit (10), and a gradient for the variable line pressure control, at step S160. The transmission control unit (70) then as shown in FIG. 3, controls the line pressure to the minimum line pressure according to the variable control gradient so as to minimize the load of the oil pump, resulting in preventing a power wastage, at step S170.

The variable line pressure control is performed in such a way that if it is the first in-gear state after reset of the battery, the transmission control unit (20) decreases the line pressure by the gradient (XVF_SPINGR1), for example 1% per 16 msec cycle, from the 100% line pressure and counts the value in respective learning areas.

When performing variable line pressure control according to the respective learning areas, however, the transmission control unit (20) does not perform the variable line pressure control at 100% of line pressure but at the point (A+[(Dvfs)min]) where the line pressure is increased by as much as a predetermined percentage at the minimum required line pressure duty, that is, the line pressure control is performed by decreasing the line pressure by the gradient (XVF_SPINGR2). For example, 0.5% per 16 msec cycle, at the point where the line pressure is increased about 20% at the minimum required line pressure duty.

In the state when the variable line pressure control is performed as above, the transmission control unit 20 determines whether or not in-gear slip occurs because of a lack of friction force caused by a decrease of the line pressure, at step S180. If in-gear slip does not occur, the transmission control unit 20 determines whether the gear shift occurs according to the change of driving conditions such as the vehicle speed and throttle opening, or the damper clutch is directly coupled at step S190.

At step S180, the in-gear slip is determined when the value obtained by subtracting the turbine rpm (Nt) from the engine rpm (Ne) while the damper clutch is in a direct coupled state is greater than a predetermined threshold rpm (about 50 rpm), or an absolute value obtained by subtracting the present turbine rpm (Nti) from the previous turbine rpm (Nt) is greater than a predetermined threshold rpm (about 50~100 rpm).

Also, in the state when the damper clutch is not completely coupled, the in-gear slip is determined when the absolute value obtained by subtracting the present turbine rpm from the previous turbine rpm (Nt) is greater than the predetermined threshold rpm (about 50~100 rpm).

If it is determined that the gear shift is not detected and the damper clutch is not directly coupled, the transmission control unit (20) determines whether or not the variable line pressure control value (D_VFS), which decreases with the gradient as shown in FIG. 3, is less than the calculated minimum line pressure duty [(Dvfs)min], at step S200.

At step S200, if the variable line pressure control value (D_VFS) is greater than the computed minimum line pressure duty value [(Dvfs)min], the transmission control unit 20 returns to the step S170 so as to continuously perform the variable line pressure control. On the other hand, if the variable line pressure control value (D_VFS) is less than the computed minimum line pressure duty value [(Dvfs)min], the transmission control unit performs the normal line pressure control, at step S210.

In the state when the normal line pressure control is performed, the transmission control unit 20 performs compensation (D_TH) according to the change of the throttle opening degree if a change of the throttle opening is detected, at step S220.

In the state when the normal line pressure control is performed, the transmission control unit 20 determines whether or not in-gear slip occurs because of the variable line pressure control at step S230. If in-gear slip does not occur, the transmission control unit (20) determines whether the gear shift occurs based on the change of the driving conditions such as the vehicle speed and throttle opening or the damper clutch being directly coupled at step S240.

At steps S180 and S230, if in-gear slip caused by the variable line pressure control is detected, the transmission control unit (20) releases the variable line pressure control mode, learns the minimum line pressure duty, and then enters the non-variable line pressure control mode at step S300.

The learning of the minimum line pressure duty is performed under conditions such that the in-gear slip is detected during the variable line pressure control, and the change degree of the throttle opening during 200 ms (XVF_TLRN) before the point where the in-gear slip is detected is in the range of ±0.3(XVF_THLRN).

The learning of the minimum line pressure duty performed when the damper clutch operates, at respective zones divided according to the shift ranges, is as in the following table 1.

TABLE 1

| Zone 1 | A/N < XVF_ILNDA (0~25%) |
| Zone 2 | XVF_ILNDA ≦ A/N < XVF_ILNDB (25~50%) |
| Zone 3 | XVF_ILNDB ≦ A/N < XVF_ILNDC (50~75%) |
| Zone 4 | XVF_ILNDC ≦ A/N (75~100%) |

The minimum line pressure duty (D_L) learned during the damper clutch operation and at respective shift ranges is compensated by adding the minimum line pressure deviation to the previous learned value.

At step S190 or S240, when the gear shift begins or the beginning of the direct coupling of the damper clutch is detected, the algorithm returns to a variable line pressure control mode during gearshifting, as shown in FIG. 2B, at step S250. Sequentially, as shown in FIG. 4, the transmission control unit 20 regards the shift begin point as a shift decision point (SD) so as to control the variable line pressure duty (VFS) to 100% and delay the shift by as much as a predetermined time (TD), and then moves to the shift begin point (SS) for typical shift control by duty control according to the change of the driving conditions, at steps S260 and S270.

Figure 4:
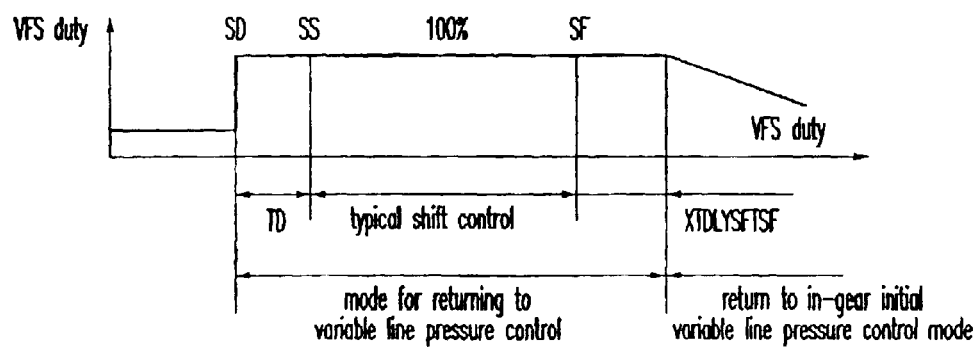
FIG. 4 is a graph illustrating line pressure control timing while the line pressure control is performed in the automotive automatic transmission according to the present invention.
Figure 5:
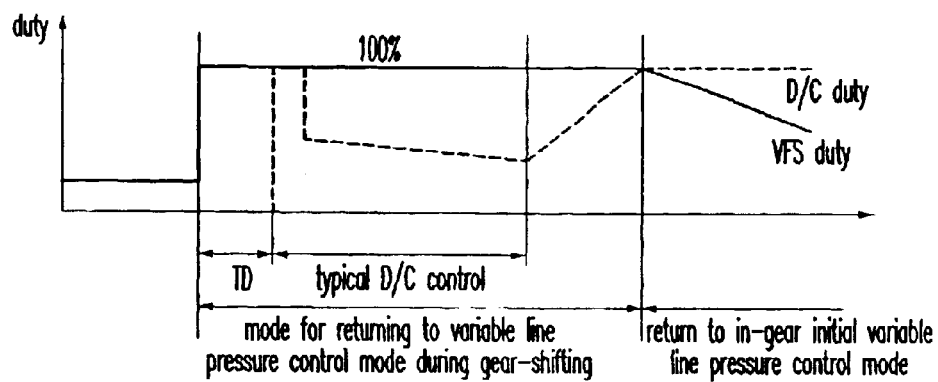
FIG. 5 is a graph illustrating control timing of a damper clutch connection while controlling normal line pressure of the automotive automatic transmission according to the present invention.

Sequentially, the transmission control unit 20 determines whether the typical shift control is completed or the damper clutch is directly coupled, that is, the point (SF) of FIG. 3 and FIG. 4 is detected, at step S280. If it is determined that the typical shift control is completed or the damper clutch is direct coupled, that is, reached the point (SF), the transmission control unit 20 delays the time by as much as a predetermined period (XTDLYSFTSF) for detecting another shift request, at step S290. If there is no successive shift request and the driving conditions detected by the driving condition detection unit 10 satisfy the variable line pressure control mode conditions, the program returns to the initial procedure so as to enter the variable line pressure control mode and perform variable line pressure control according to the driving conditions.

Also, if the lift-foot-up is delayed after the kick-down, the transmission control unit 20 returns to the variable line pressure control mode during the gear shifting so as to maintain the line pressure duty at 100% until the next shift is required.

After completing the gear shift, that is, after the point (SF) is detected, if there is a shift command generated, the transmission control unit 20 sets the shift begin point to SS and sets the delay time (TD) to 0 ms.

Also, when the damper clutch is directly coupled, the transmission control unit 20 controls in order for the line pressure duty to be 100% and then delays performing the normal damper clutch control by as much as a predetermined period (TD) from the time point when the damper clutch is completely coupled, and enters the variable in-line line pressure control mode if the damper clutch control duty (D/C duty) reaches the maximum value.

It is preferred that the predetermined delay period (TD) should be as short as possible, such that the transmission control unit 20 sets a map table based on a line pressure control duty value (VFS) in a power-on up-shift condition, and based on the line pressure duty value (VFS) prior to a predetermined period from the point SD in a power-off up-shift condition.

Also, the TD is determined by subtracting a slow kick-down compensation value (Tsk) from the mapping value (Tdo) set based on the line pressure duty value (VFS) prior to the predetermined period from the point SD.

The slow kick-down compensation value is calculated as in the following equation 1.

$$Tsk = \text{sum}\Delta D\_VFS \times Csk \qquad \text{Equation 1}$$

where sum$\Delta$D_VFS is a rate of change of the line pressure control duty value (D_VFS) between a point prior to a predetermined period from the SD and the SD.

sumΔD_VFS can be expressed as follows:

$$\text{sum}\Delta D\_VFS = \Delta D\_VFS(i-x) + \Delta D\_VFS(i-x+1) + \ldots + \Delta(D\_VFS(i-2)) + \Delta(D\_VFS(i-1)) \quad \text{Equation}$$

where x is the slow kick-down compensation value, Csk is a compensation measurement which is expressed in unit of ms/%, and ΔD_VFS(j)=D_VFS(i−x)−D_VFS (j).

Figure 6:
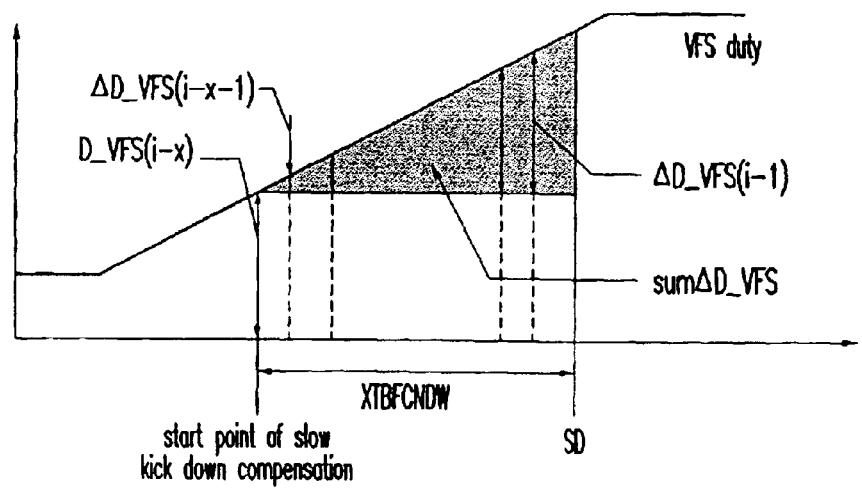
FIG. 6 is a graph illustrating delay time compensation control timing in line pressure duty control of the transmission according to the present invention.

D_VFD(i−x) is the line pressure control duty value (D_VFS) at the point prior to a certain period from the SD, and is expressed in units of %. However, the slow kick-down compensation value Tsk is set to 0 ms when the slow kick-down compensation value Tsk is below 0 ms. Accordingly, the delay time compensation based on the line pressure control duty value behavior in the slow kick-down changes is shown in FIG. 6.

Also, the delay time (TD) is determined from the mapping value set based on the line pressure duty value (VFS) in the power-off down-shift condition and from the mapping value set based on the line pressure control duty value when the damper clutch is completely coupled.

At step S160, the minimum required line pressure duty [(Dvfs)min] is calculated, as follows. First, the engine brake torque (TB) is calculated using the compensation value (TQL_hex) and torque loss (TQFR_hex) caused by inner friction of the engine, which are obtained based on driving conditions such as the maximum engine torque (TQ_STND), intake air amount, temperature of the intake air, fuel injection amount, ignition point, and the like. The engine torque is calculated as in the following equation 2.

$$TB = TQ\_STND * (TQI\_hex - TQFR\_hex)/255/9.8 \quad \text{Equation 2}$$

After the engine brake torque (TB) is calculated, the turbine torque (TT) is calculated using the engine brake torque (TB) and the torque converter torque ratio (tr) as in the following equation 3, and the torque converter torque ratio is the value read using the interpolation method according to a ratio of the turbine rpm (Nt) to the engine rpm (Ne) (Nt/Ne) in a torque ratio map of the torque converter.

$$TT = TB * tr \quad \text{Equation 3}$$

After the turbine torque (TT) is calculated, a required line pressure (PL) is calculated, as follows.

In the 4 range automatic transmission, the required line pressure (PL) in the state where the damper clutch (D/C) is directly coupled is calculated as in the following equation 4.

$$PL = XVF\_PTDC \times XVF\_SF \times TT \quad \text{Equation 4}$$

where XVF_PTDC is a turbine torque coefficient for calculating the required line pressure (PL) when the damper clutch (D/C) is in the direct coupled state, XVF_SF is a safety factor of about 1.2, and TT is the turbine torque.

However, when the damper clutch (D/C) is not in the direct coupled state, the required line pressure (PL) is calculated as in the following equations 5:

1st gear−$PL = XVF\_PTA \times XVF\_SF \times TT + XVF\_OFB$

2nd gear−$PL = XVF\_PTA \times XVF\_SF \times TT + XVF\_OFB$

3rd gear−$PL = XVF\_PTA \times XVF\_SF \times TT + XVF\_OFB$

4th gear−$PL = XVF\_PTA \times XVF\_SF \times TT + XVF\_OFB$ Equation 5 where XVF PTDCA is a turbine torque coefficient for calculating the required line pressure (PL) at the corresponding range, XVF_SF is a safety factor of about 1.2, TT is turbine torque, and XVF_OFB is an offset value for calculating the required line pressure (PL) at the corresponding range.

At this time, when the required line pressure (PL), calculated using equation 4 and equation 5, is less than the preset minimum line pressure [3.2(XVF_PLMIN)], the required line pressure (PL) is set equal to the minimum line pressure [3.2(XVF_PLMIN)].

Also, in the 5 range automatic transmission, the required line pressure (PL) in the direct coupled state of the damper clutch (D/C) is calculated as in the following equations 6:

2nd gear−$PL = XVF\_PTDCA \times XVF\_SF \times TT + XVF\_OFB$

4th gear−$PL = XVF\_PTDCA \times XVF\_SF \times TT + XVF\_OFB$

5th gear−$PL = XVF\_PTDCA \times XVF\_SF \times TT + XVF\_OFB$ Equation 6 where XVF_PTA is a turbine torque coefficient for calculating the required line pressure (PL) at the corresponding range, XVF_SF is a safety factor of about 1.2, TT is turbine torque, and XVF_OFB is an offset value for calculating the required line pressure (PL) at the corresponding range.

However, when the damper clutch (D/C) is in the direct coupled state at either of the 1 or 3 range, the required line pressure (PL) is calculated as in the following equation 7:

$$PL = XVF\_PTDC \times XVF\_SF \times TT \quad \text{Equation 7}$$

Also, at the normal ranges where the damper clutch (D/C) is not in the direct coupled state, the required line pressure (PL) is calculated as in the following equations 8:

1st gear−$PL = XVF\_PTA \times XVF\_SF \times TT + XVF\_OFB$

2nd gear−$PL = XVF\_PTA \times XVF\_SF \times TT + XVF\_OFB$

3rd gear−$PL = XVF\_PTA \times XVF\_SF \times TT + XVF\_OFB$

4th gear−$PL = XVF\_PTA \times XVF\_SF \times TT + XVF\_OFB$

5th gear−$PL = XVF\_PTA \times XVF\_SF \times TT + XVF\_OFB$. Equation 8

At this time, when the required line pressure (PL) calculated through the equation 6, equation 7, or equation 8 is less than the preset minimum line pressure [3.2(XVF_PLMIN)], the required line pressure (PL) is set equal to the minimum line pressure [3.2(XVF_PLMIN)].

After the required line pressure (PL) is calculated through the above equations, a deviation value [D_BASE=TPVFS (PL)] is calculated referring to a database in which a standard duty value for the line pressure control is set.

After the deviation value [D_BASE=TPVFS(PL)] is calculated, the minimum line pressure [(Dvfs)min)] is calculated as in the following equation 9:

$$(Dvfs)\min = (D\_BASE + D\_L) \times C\_TEMP \times C\_NE + D\_TH \quad \text{Equation 9}$$

where D_L is a learned value of the line pressure duty to be described below, C_TEMP is a hydraulic fluid temperature compensation value, C_NE is an engine rpm compensation value, and D_TH is a throttle-opening compensation value.-

The throttle-opening compensation value (D_TH) is calculated as in the following equation 10:

$$D\_TH = sum[Dth(i-x) + Dth(i-x+1) + Dth(i-x+2) + \ldots + Dth(i-1)] \quad \text{Equation 10}$$

where $Dth(i) = (dVth/dt(i)) * Cth$ is expressed in units of %, and $dVth/dt(i)$ is a change rate of TPS [V/s] (calculated per cycle).

However, in the case of $dVth/dt(i) \leq 0$, $dVth/dt(i)$ is set to 0, Cth is compensation factor [%/V/s], and x is a compensation time (XVF_THLDTH[ms]/16 ms) according to the change of the throttle opening degree.

As described above, in the automotive automatic transmission of the present invention, the minimum line pressure is calculated according to the driving conditions and then the minimum line pressure is controlled to be the minimum required line pressure so as to improve gasoline mileage and shift quality.

What is claimed is:

1. A hydraulic control system for an automotive automatic transmission, comprising:
   a driving condition detection unit for detecting driving conditions of a vehicle;
   a transmission control unit for performing variable line pressure control using a minimum line pressure and a line-pressure-decreasing gradient, the line pressure control being calculated on a basis of an engine brake torque and a torque converter torque ratio wherein the engine brake torque is determined on a basis of engine torque loss and wherein a minimum line pressure duty is determined based on the calculated required line pressure and a preset minimum line pressure when variable line pressure control entrance conditions exist; and
   a driving unit adjusting a duty ratio of line pressure applied to friction elements based on a line pressure control signal generated by the transmission control unit.

2. The hydraulic control system of claim 1, wherein the driving condition detection unit comprises:
   an engine rpm sensor for detecting engine rpm of the vehicle;
   a throttle-opening sensor for detecting a throttle opening degree;
   a turbine rpm sensor for detecting turbine rpm of a torque converter of the vehicle;
   a driving shaft rpm sensor for detecting rpm of a driving shaft of the vehicle;
   a hydraulic fluid temperature sensor for detecting hydraulic fluid temperature of the automatic transmission;
   an atmospheric pressure sensor for detecting atmospheric pressure of an area where the vehicle is running; and
   an inhibit-on switch for detecting a position of a shift lever.

3. The hydraulic control system of claim 1, wherein the transmission control unit calculates a compensation value for variable line pressure control duty according to the throttle opening degree.

4. The hydraulic control system of claim 1, wherein the transmission control unit controls such that a variable line pressure control duty increases according to the change of the throttle opening degree and then is eliminated when engine power is normalized.

5. The hydraulic control system of claim 1, wherein the automatic transmission control unit calculates a line pressure control compensation value and hydraulic characteristics according to a hydraulic fluid temperature and engine rpm, and applies the line pressure control compensation value and hydraulic character to a variable line pressure control duty.

6. The hydraulic control system of claim 1 wherein the transmission control unit calculates a compensation value for a clutch friction coefficient according to a deviation and durability of the transmission and reflects the compensation value to a variable line pressure control duty.

7. The hydraulic control system of claim 1, wherein the transmission control unit learns a minimum required line pressure by detecting an in-gear slip.

8. The hydraulic control system of claim 1, wherein the transmission control unit sets a delay time for increasing a shift begin line pressure to 100% for control stability.

9. The hydraulic control system of claim 1, wherein the transmission control unit sets a minimum delay time by estimating a line pressure at a shift begin point without a hydraulic pressure sensor and a time taken for the line pressure reach to 100%.

10. The hydraulic control system of claim 1, wherein the transmission control unit sets a minimum shift delay time in a slow kick-down.

11. The hydraulic control system of claim 1, wherein the transmission control unit sets a minimum shift delay time during lift-foot-up.

12. A hydraulic control method comprising:
   determining whether or not driving conditions detected in a non-variable line pressure control mode satisfy variable line pressure control entrance conditions;
   determining whether or not gears are in an in-gear state by calculating a gear ratio using an engine rpm and turbine rpm when the driving conditions satisfy the variable line pressure control entrance conditions;
   entering a variable line pressure control mode in an in-gear state, and performing the variable line pressure control by calculating a minimum line pressure and variable line pressure gradient wherein the variable line pressure control is calculated based at least in part on an engine brake torque and a torque converter torque ratio, wherein the engine brake torque is determined on a basis of engine torque loss, and wherein a minimum line pressure duty is determined based on the calculated required line pressure and a preset minimum line pressure;
   determining whether or not a present line pressure is less than the calculated minimum line pressure;
   performing a normal line pressure control when the present line pressure is less than the minimum line pressure and then determining whether a gear shift starts or a damper clutch is in a direct coupled state;
   performing a gear shift to a target gear ratio after a predetermined time from a point when a line pressure control duty reaches 100% if it is determined that the gear shift starts or the damper clutch is in the direct coupled state in normal line pressure control; and
   performing variable line pressure control according to the driving conditions by entering the variable line pressure control mode for determining another shift begin point after delaying for a predetermined time if the gear shift to the target gear ratio is completed.

13. The hydraulic control method of claim 12, wherein the variable line pressure control mode entrance conditions include:
   a present hydraulic fluid temperature is between a preset lowest limit minimum value and lowest limit maximum value;
   a (Controller Area Network) CAN communication line providing an interface for various control data and detection signals is not broken down;

an inhibit-on switch, hydraulic sensor, and line pressure solenoid valve are normal;

a present detected atmospheric pressure value is less than a threshold atmospheric pressure value for determining whether or not a vehicle is running at a high altitude;

a shift lever is positioned at one the D, 4, 3, and 2 ranges, or 2, 3, 4, and 5 ranges in sports mode;

a throttle opening degree (TPS) is less than a preset threshold opening degree with a compensation value added thereto;

an engine rpm is less than a threshold engine rpm; and engine rpm detection and turbine rpm detection are performed normally.

14. The hydraulic control method of claim 12, wherein when driving condition data do not satisfy the variable line pressure control mode entrance conditions, a line pressure control mode returns to a non-variable line pressure control mode.

15. The hydraulic control method of claim 12, wherein a line pressure control mode returns to a non-variable line pressure control mode if an in-gear state is not detected.

16. The hydraulic control method of claim 12, wherein the in-gear state is a state where certain gears are engaged for a predetermined gear ratio according to driving conditions.

17. The hydraulic control method of claim 12, wherein the variable line pressure control is performed in such a way that if it is the first in-gear state after reset of a battery, the transmission control unit decreases the line pressure from 100% by a gradient per cycle and stores count values in respective learning areas.

18. The hydraulic control method of claim 12, wherein in a case of performing variable line press control according to respective learning areas, the variable line pressure control is not performed at 100% of line pressure but at the point (A+((Dvfs)min)) where the line pressure is increased by as much as a predetermined percentage at the minimum required line pressure duty.

19. The hydraulic control method of claim 12, wherein minimum line pressure calculation includes:

detecting an engine brake torque (TB);

detecting a turbine torque (TT);

detecting a required line pressure (PL);

detecting a standard value (D_BASE) of the required line pressure from a standard duty of the line pressure; and calculating the minimum line pressure by adding various compensating coefficients to the standard value (D_BASE) of the required line pressure.

20. The hydraulic control method of claim 12, wherein if an in-gear slip is detected while the variable line pressure control controls to the minimum line pressure, a new minimum line pressure is learned according to the driving conditions and vehicle's durability, and then the minimum line pressure is reflected to the variable line pressure control.

21. The hydraulic control method of claim 12, wherein if another gear shift begins or a damper clutch is in a direct coupled state, the line pressure duty increases to 100%, and then the gear shift to the target gear ratio is performed after a predetermined time delay.

22. The hydraulic control method of claim 12, wherein if a throttle opening degree is charged in the variable line pressure control, the line pressure is compensated according to the change of the throttle opening degree.

23. The hydraulic control method of claim 12, wherein if an in-gear slip is detected in a normal line pressure control procedure, a minimum line pressure is learned according to the driving conditions and vehicle's durability and applied for the line pressure control.

24. The hydraulic control method of claim 12, wherein the delay time is set, in a map table, based on the line pressure at a shift begin point in a power-on up-shift condition, based on the line pressure at a point prior to a predetermined period from the shift begin point in a power-off up-shift condition, based on a value obtained by subtracting a slow kick-down compensation value (Tsk) from a map value (Tdo) set at a point prior to a predetermined period from the shift begin point at a power-on down-shift condition, and based on the line pressure at the shift begin point in the power-off down-shift condition.

25. The hydraulic control method of claim 19, wherein the engine brake torque (TB) is calculated using a maximum engine torque (TQ_STND), a compensation vale (TOI_hex) obtained based on the driving conditions such as an intake air amount, temperature of the intake air, fuel injection amount, ignition point, and the like, and a torque loss caused by engine friction, according to the following equation:

$$TB=TQ\_STND*(TQI\_hex-TQFR\_hex)/255/9.8.$$

26. The hydraulic control method of claim 19, wherein the turbine torque (TT) is calculated using a torque ratio (tr) of a torque converter obtained according to a ratio (Nt/Ne) of an engine rpm (Ne) and turbine rpm (Nt) in a map (TTRQRTP) of a ratio of the engine torque and torque converter torque, according to the following equation:

$$TT=TB*tr.$$

27. The hydraulic control method of claim 19, wherein, in the 4 range automatic transmission, the required line pressure (PL) in the state where the damper clutch (D/C) is directly coupled is calculated as in the following equation:

$$PL=\text{turbine torque coefficient } (XVF\_PTDC) \times \text{safe factor } (XVF\_SF) \times \text{turbine torque } (TT);$$

it is calculated as in the following equation 14 when the damper clutch (D/C) is not in the direct coupled state:

$$\text{1st gear–}PL=XVF\_PTA \times XVF\_SF \times TT+XVF\_OFB$$

$$\text{2nd gear–}PL=XVF\_PTA \times XVF\_SF \times TT+XVF\_OFB$$

$$\text{3rd gear–}PL=XVF\_PTA \times XVF\_SF \times TT+XVF\_OFB$$

$$\text{4th gear–}PL=XVF\_PTA \times XVF\_SF \times TT+XVF\_OFB;$$

and in a 5 range automatic transmission, the required line pressure (PL) in the direct coupled state of the damper clutch (D/C) is calculated as in the following equations:

$$\text{2nd gear–}PL=XVF\_PTDCA \times XVF\_SF \times TT+XVF\_OFB$$

$$\text{4th gear–}PL=XVF\_PTDCA \times XVF\_SF \times TT+XVF\_OFB$$

$$\text{5th gear–}PL=XVF\_PTDCA \times XVF\_SF \times TT+XVF\_OFB;$$

when the damper clutch (D/C) is in the direct coupled state at any of the 1 and 3 range, the required line pressure (PL) is calculated as in the following equation:

$$PL = XVF\_PTDC \times XVF\_SF \times TT;$$

and at the normal ranges where the damper clutch (D/C) is not in the direct coupled state, the required line pressure (PL) is calculated as in the following equation:

1st gear-$PL = XVF\_PTA \times XVF\_SF \times TT + XVF\_OFB$

2nd gear-$PL = XVF\_PTA \times XVF\_SF \times TT + XVF\_OFB$

3rd gear-$PL = XVF\_PTA \times XVF\_SF \times TT + XVF\_OFB$

4th gear-$PL = XVF\_PTA \times XVF\_SF \times TT + XVF\_OFB$

5th gear-$PL = XVF\_PTA \times XVF\_SF \times TT + XVF\_OFB;$ wherein when the required line pressure (PL) is less than the preset minimum line pressure (3.2(XVF PLMIN)), the required line pressure (PL) is set equal to the minimum line pressure (3.2(XVF PLMIN)), XVF_PTA is a turbine torque coefficient for calculating the required line pressure (PL) at the corresponding range, XVF_SF is a safety factor which is about 1.2, TT is a turbine torque, and XVF_OFB is an offset value for calculating the required line pressure (PL) at the corresponding range.

28. The hydraulic control method of claim 19, wherein minimum line pressure ((Dvfs)min) is calculated as in the following equation:

$$(Dvfs)min = (D\_BASE + D\_L) \times C\_TEMP \times C\_NE + D\_TH,$$

where D_L is a learned value of the line pressure duty, C_TEMP is a hydraulic fluid temperature compensation value, C_NE is an engine rpm compensation value, and D_TH is a throttle-opening compensation value.

29. The hydraulic control method of claim 20, wherein the in-gear slip is determined: when the value obtained by subtracting the turbine rpm (Nt) from the engine rpm (Ne) is greater than a predetermined first threshold rpm, or an absolute value obtained by subtracting the present turbine rpm (Nti) from the previous turbine rpm (Nt) is greater than a predetermined second threshold rpm, while the damper clutch is in direct coupled state; or when the absolute value obtained by subtracting the present turbine rpm (Nti) from the previous turbine rpm (Nt) is greater than a third threshold rpm, while the damper clutch is not completely coupled.

30. The hydraulic control method of claim 23, wherein the in-gear slip is determined: when the value obtained by subtracting the turbine rpm (Nt) from the engine rpm (Ne) is greater than a predetermined first threshold rpm, or an absolute value obtained by subtracting the present turbine rpm (Nti) from the previous turbine rpm (Nt) is greater than a predetermined second threshold rpm, while the damper clutch is in direct coupled state; or when the absolute value obtained by subtracting the present turbine rpm (Nti) from the previous turbine rpm (Nt) is greater than a third threshold rpm, while the damper clutch is not completely coupled.

31. The hydraulic control method of claim 24, wherein the slow kick-down compensation value is calculated as in the following equation:

$$Tsk = sum\Delta D\_VFS \times Csk$$

where sum$\Delta$D_VFS is a rate of change of the line pressure control duty value (D_VFS) between a point prior to a predetermined period from the SD and the SD, sum$\Delta$D_VFS can be expressed as in the following:

$$sum\Delta D\_VFS = (\Delta D\_VFS(i-x) + \Delta(D\_VFS(i-x) + \ldots + \Delta(D\_VFS(i-2) + \Delta(D\_VFS(i-1)))$$

where x is the slow kick-down compensation value, Csk is a compensation measurement which is expressed in unit of ms/%, and $\Delta$D_VFS(j)=D_VFS(i-x)-D_VFS(j), D_VFD(i-x) is the line pressure control duty value (D_VFS) at the point prior to a certain period from the SD and expressed in the unit of %.

32. The hydraulic control method of claim 28, wherein the throttle-opening compensation value (D_TH) is calculated as in the following equation:

$$D\_TH = sum(Dth(i-x) + Dth(i-x+1) + Dth(i-x+2) + \ldots + Dth(i-2) + Dth(i-1))$$

where Dth(i)=(dVth/dt(i)) * Cth is expressed in unit of %, dVth/dt(i) is a change rate of TPS (V/s)(calculated per cycle); however, in case of dVth/dt(i)$\leq$0, dVth/dt(i) is set to 0, Cth is compensation factor (%/V/s), x is a compensation time (XVF_THLDTH(ms)/16 ms) according to the change of the throttle opening degree.

* * * * *